(12) United States Patent
Arnlund

(10) Patent No.: US 11,548,477 B2
(45) Date of Patent: Jan. 10, 2023

(54) WIPER SYSTEM AND A VEHICLE COMPRISING SUCH A WIPER SYSTEM

(71) Applicant: Volvo Truck Corporation, Gothenburg (SE)

(72) Inventor: Emil Arnlund, Umeå (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/770,110

(22) PCT Filed: Oct. 24, 2019

(86) PCT No.: PCT/EP2019/078983
§ 371 (c)(1),
(2) Date: Apr. 19, 2022

(87) PCT Pub. No.: WO2021/078384
PCT Pub. Date: Apr. 29, 2021

(65) Prior Publication Data
US 2022/0355764 A1    Nov. 10, 2022

(51) Int. Cl.
*B60S 1/34* (2006.01)
(52) U.S. Cl.
CPC ........... *B60S 1/3495* (2013.01); *B60S 1/3411* (2013.01); *B60S 1/3459* (2013.01); *B60S 1/3486* (2013.01)
(58) Field of Classification Search
CPC .... B60S 1/3495; B60S 1/3411; B60S 1/3459; B60S 1/3486; B60S 1/347; B60S 1/0491
USPC .......................................... 15/250.15, 250.34
See application file for complete search history.

(56) References Cited

U.S. PATENT DOCUMENTS

| 5,890,256 A | 4/1999 | Eustache |
| 2016/0023638 A1* | 1/2016 | Kato ..................... B60S 1/3495 15/250.15 |

FOREIGN PATENT DOCUMENTS

| DE | 4307995 A1 | 9/1994 |
| FR | 2907733 A1 | 5/2008 |
| FR | 2931761 A1 | 12/2009 |

(Continued)

OTHER PUBLICATIONS

International Search Report and Written Opinion for International Patent Application No. PCT/EP2019/078983, dated Jul. 9, 2020, 26 pages.

(Continued)

*Primary Examiner* — Katina N. Henson
(74) *Attorney, Agent, or Firm* — Withrow & Terranova, PLLC

(57) ABSTRACT

A wiper system (10), comprising a wiper arm (12) having a geometrical axis of rotation (x), a connecting arrangement (14) configured to connect the wiper arm to a motor-driven rotating shaft (100), wherein the connecting arrangement is configured to transfer the rotating motion of the shaft into a rotating motion of the wiper arm about said geometrical axis of rotation, a spring arrangement (24) configured to resiliently press the wiper arm against the connecting arrangement in the axial direction, and a tilting arrangement (30) configured to vary the inclination of the pressed wiper arm relative to said geometrical axis of rotation based on the rotational position of the wiper arm about said geometrical axis of rotation. There is also provided a vehicle comprising such a wiper arm system.

17 Claims, 12 Drawing Sheets

(56) References Cited

FOREIGN PATENT DOCUMENTS

| | | |
|---|---|---|
| JP | H07186890 A | 7/1995 |
| JP | 3006385 B2 | 2/2000 |

OTHER PUBLICATIONS

Intention to Grant for European Patent Application No. 19794145.3, dated Oct. 18, 2022, 37 pages.

\* cited by examiner

WIPER SYSTEM AND A VEHICLE COMPRISING SUCH A WIPER SYSTEM

This application is a 35 USC 371 national phase filing of International Application No. PCT/EP2019/078983, filed Oct. 24, 2019, the disclosure of which is incorporated herein by reference in its entirety.

TECHNICAL FIELD

The invention relates to a wiper system comprising a wiper arm. The invention also relates to a vehicle comprising such a wiper system.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

The vehicle industry is constantly striving to reduce fuel or power consumption. To this end more aerodynamic shapes of the vehicles are developed. This is the case not only for passenger cars, but also for trucks and other vehicles. For instance, for trucks, developers and designers strive to provide a more aerodynamic shape to the cab of the truck. This implies a more curved windscreen which impacts related features such as the windscreen wiper system of the vehicle. To achieve a good wipe with windscreen wipers, the attack angle of the wiper blade should be as normal to the windscreen as possible and maintaining a substantially constant angle to the same throughout the complete wiping motion. With a highly curved windscreen and a conventional wiper system this is not achievable for some parts of the windscreen.

SUMMARY

An object of the invention is to provide a wiper system which alleviates at least some of the drawbacks with conventional wiper systems.

According to a first aspect of the invention, the object is achieved by a wiper system, comprising:
- a wiper arm having a geometrical axis of rotation, said geometrical axis of rotation extending in an axial direction,
- a connecting arrangement configured to connect the wiper arm to a motor-driven rotating shaft, wherein the connecting arrangement is configured to transfer the rotating motion of the shaft into a rotating motion of the wiper arm about said geometrical axis of rotation,
- a spring arrangement configured to resiliently press the wiper arm against the connecting arrangement in the axial direction, and
- a tilting arrangement configured to vary the inclination of the pressed wiper arm relative to said geometrical axis of rotation based on the rotational position of the wiper arm about said geometrical axis of rotation.

By the provision of a spring arrangement in combination with a tilting arrangement, a good wiping result is achievable even for a highly curved windscreen. In particular, by pressing the wiper arm in the axial direction, a good contact with the windscreen will be maintained even though the inclination of the pressed wiper arm is varied by the tilting arrangement. Thus, the risk of intermittently weakened contact due to the varying inclination is reduced by resiliently pressing the wiper arm. Put differently, the spring arrangement stabilises the wiper arm throughout its rotating and tilting motion.

According to at least one exemplary embodiment, said connecting arrangement forms part of a constant-velocity joint, which may also be referred to as a CV joint. A CV joint allows a drive shaft to transmit power through a variable angle at a constant rotational speed, without any appreciable increase in friction or play. This is advantageous, since the force transfer of the CV joint will provides the same rotational speed on the wiper arm as on the rotating shaft, thereby achieving good motion control irrespective of the inclination of the wiper arm.

According to at least one exemplary embodiment, an end portion of said wiper arm comprises at least one race groove defined by a race groove wall, wherein the connecting arrangement comprises at least one ball configured to mate with said race groove and to transmit the rotating force of the shaft to the wiper arm via engagement with the race groove wall. Thus, having a ball which can travel in a race groove, not only allows for the possibility to incline the wiper arm, but can also provide a means of force transfer. The race groove may have a substantially longitudinal extension. For instance, in some exemplary embodiments, there may be defined a geometrical plane along which both the geometrical axis of rotation and the race groove extends. If a plurality of race grooves are provided, each individual race groove may extend in a respective common geometrical plane with the geometrical axis or rotation. However, in other exemplary embodiments, the one or more race grooves may have a longitudinal extension which is somewhat inclined relative to the geometrical planes in along which the geometrical axis of rotation extends.

According to a more general exemplary embodiment, an end portion of said wiper arm comprises at least one pocket (such as the above-mentioned race groove) defined by a pocket wall, wherein the connecting arrangement comprises at least one ball configured to mate with said pocket and to transmit the rotating force of the shaft to the wiper arm via engagement with the pocket wall.

According to at least one exemplary embodiment, the connecting arrangement comprises a plurality of circumferentially distributed balls configured to mate with a respective one of a plurality of race grooves (or more generally, one of a plurality of pockets) in said end portion of said wiper arm for transmitting the rotating force of the shaft to the wiper arm. By having a plurality of circumferentially distributed balls, the force transfer becomes more effective. Furthermore, a more balanced control may be achievable. Suitably, the balls are equidistantly distributed in the connecting arrangement.

According to at least one exemplary embodiment, the connecting arrangement comprises a cage holding said plurality of balls. This is advantageous since it maintains the relative position/distance between the balls substantially constant. The cage may thus comprise individual cage holes, one for each ball.

According to at least one exemplary embodiment, the connecting arrangement comprises a sleeve configured to be attached to said shaft so as to rotate with the shaft, wherein the cage is configured to surround the sleeve. This is advantageous since the sleeve may be designed with an appropriate interface with which the balls held in the cage may interact for transferring the force from a conventional rotating shaft. To fit a conventional motor-driven rotating shaft, the sleeve may for instance have interior splines for mating with corresponding splines of the shaft, and/or the sleeve may be press-fitted to the shaft. The exterior of the sleeve may have a structured surface, such as including grooves, for accommodating the balls held by the cage. Thus, the surrounding cage may be connected to the sleeve via the balls. Advantageously, the cage keeps the balls in a common plane, which plane suitably extends through the centre of the sleeve irrespective of the inclination of the cage.

According to at least one exemplary embodiment, the sleeve is provided with a plurality of cavities for receiving a respective one of said plurality of balls so that each ball is partly housed in one of said plurality of cavities and partly housed in one of said plurality of race grooves. The cavities in the sleeve may suitably also be in the form of race grooves, similarly to the race grooves in the wiper arm.

According to at least one exemplary embodiment, the connecting arrangement is configured to enable the wiper arm to tilt in any radial direction, wherein a radial direction is defined as a direction extending perpendicularly from the geometrical axis of rotation. This is advantageous since it allows the wiper arm to follow windscreens with challenging curvatures even better, and the windscreen can be wiped with a satisfactory result. Suitably, the longitudinal extension of the wiper arm is along a radial direction. Thus, according to at least some exemplary embodiments, the connecting arrangement may be configured to enable the wiper arm to tilt along its longitudinal extension.

According to at least one exemplary embodiment, the race grooves and balls are configured and dimensioned to allow the wiper arm to tilt in any radial direction, wherein a radial direction is defined as a direction extending perpendicularly from the geometrical axis of rotation. This too provides for a satisfactory wiping result for the above mentioned challenging windscreen curvatures.

According to at least one exemplary embodiment, said tilting arrangement comprises a cam mechanism. This is advantageous, since a cam mechanism provides a simple yet efficient way of tilting the wiper arm in various angles, as desired. However, it should be noted that other types of tilting arrangements are also conceivable. For instance, in at least some exemplary embodiments, the tilting arrangement may comprise an actuator, such as a motorized actuator, or a spring mechanism, or any other suitable device which can apply a tilting force onto the wiper arm.

In the case of the tilting arrangement comprising a cam mechanism, then according to at least one exemplary embodiment, said cam mechanism may be radially offset relative to the geometrical axis of rotation. Suitably, part of the cam mechanism may be located externally to the wiper arm, although an internally located cam mechanism is also conceivable.

According to at least one exemplary embodiment, the wiper system further comprises a fixed component relative to which the wiper arm is movable, wherein the cam mechanism comprises a cam surface having a varying inclination relative to the geometrical axis of rotation and a mating surface with which the cam surface cooperates, wherein one of the wiper arm and the fixed component is provided with the cam surface and the other one of the wiper arm and the fixed component is provided with the mating surface. For instance the wiper arm may be provided with the cam surface, while the fixed component may be provided with the mating surface. In at least some exemplary embodiments, two or more fixed components may be provided, for instance diametrically opposite each other on either side of the geometrical axis of rotation. A cam surface on the wiper arm may in such case ride on respective mating surfaces of the two fixed components.

According to at least one exemplary embodiment, the at least one fixed component may be in the form of a ball bearing held in place by a fixture. The ball bearing may have a wear surface in the form of a wheel which presents said mating surface. Thus, it should be understood that although the ball bearing is fixed in one place, it is allowed to rotate around its own axis.

According to at least one exemplary embodiment, the at least one fixed component may be in the form of a rotatable sphere held in place by a fixture. The surface of the sphere may form said mating surface on which the cam surface of the wiper arm may ride.

According to at least one exemplary embodiment, said cam surface is a radially projecting surface of the wiper arm, wherein said mating surface is formed by spherical or partly spherical component provided radially displaced from said geometrical axis of rotation. In other exemplary embodiments, the radially projecting surface of the wiper arm may ride on a mating surface formed by a torus-shaped component.

According to at least one exemplary embodiment, the spring arrangement is configured to cause said cam surface and said mating surface to be pressed against each other. Thus, a steady and controlled variable tilting is obtainable by providing for a good contact between the cam surface and the mating surface.

According to at least one exemplary embodiment, the said spring arrangement comprises a stack of disc springs. This is advantageous since a stack of disc springs offer a compact design. However, it should be understood that other exemplary embodiments are also conceivable, such as for instance providing a spring arrangement with a compression spring.

According to at least one exemplary embodiment, said spring arrangement extends from an abutment surface, such as a surface of a washer or a nut flange, to the wiper arm or to an intermediate contact component such as a washer, in contact with the wiper arm. For instance, a nut may have an elongate shaft which forms a female contact with a corresponding male contact of the rotating shaft. The elongate shaft may, for instance, have an internal thread for engagement with an external thread on the rotating shaft. A flange extending radially from the shaft may provide an abutment surface for the spring arrangement, or a washer may be provided between such a flange and the spring arrangement (in which case the washer provides the abutment surface). Similarly, a shelf in the wiper arm, or a washer on such a shelf, may provide an opposite abutment surface to which the spring arrangement extends.

According to a second aspect of the invention, the object is achieved by a vehicle comprising a motor-driven rotating shaft and a wiper system according to the first aspect (including any embodiment thereof), wherein the connecting arrangement connects the wiper arm to the motor-driven rotating shaft.

The advantages of the various embodiments of the second aspect are largely analogous to the advantages of the corresponding embodiments of the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
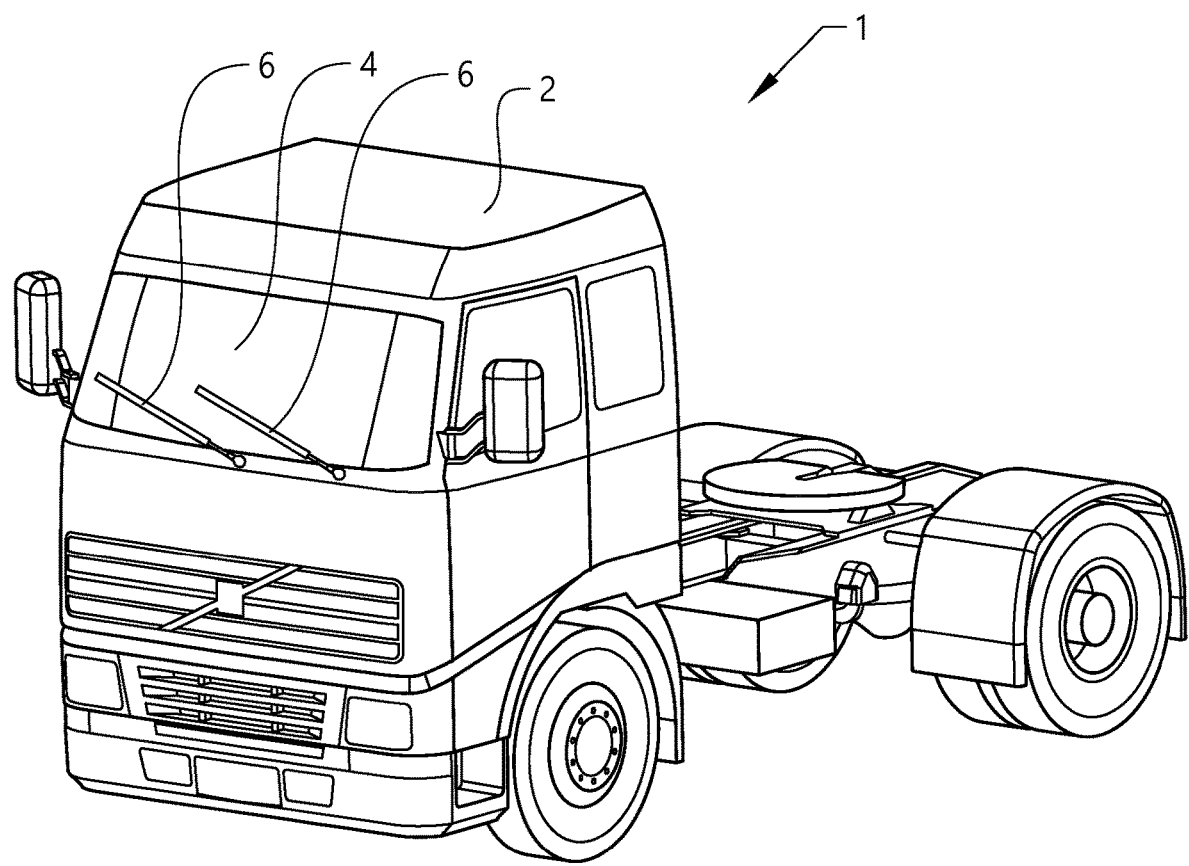
FIG. 1 illustrates a vehicle comprising a wiper system, in accordance with at least one exemplary embodiment of the invention.

FIG. 1 illustrates a vehicle 1 comprising a wiper system, in accordance with at least one exemplary embodiment of the invention. Although the vehicle 1 is illustrated in the form of a truck, other types of vehicles, such as busses construction equipment or cars, etc. may be provided with the inventive wiper system.

The truck (vehicle) comprises a cab 2 in which a driver may operate the vehicle 1. The cab 2 comprises a front window 4 (may also be referred to as a windscreen) at which two wipers 6 are provided. It should be understood that in other exemplary embodiments there may instead be a single wiper. In further exemplary embodiments there may be more than two wipers, for instance three or more. In the present example, each wiper 6 comprises a wiper arm which forms part of a wiper system according to at least one exemplary embodiment of the invention. The vehicle 1 further comprises motor-driven rotating shaft (not illustrated in FIG. 1) to which the wiper system is connected.

It should also be noted that the vehicle 1 is only shown for illustrative purposes. Thus, it should be understood that the shape may be quite different. For instance, the wiper system of the present invention is particularly suitable for use at a window having a relatively large curvature, wherein the wiper system is designed to follow the curvature of the window throughout its back-and-forth stroke.

Although the wiper system has been illustrated as being provided at the front window 4 of the vehicle, it should be understood that for other vehicles a wiper system could also, or alternatively, be provided to other windows of a vehicle, for instance to a rear window of a vehicle.

Figure 2:
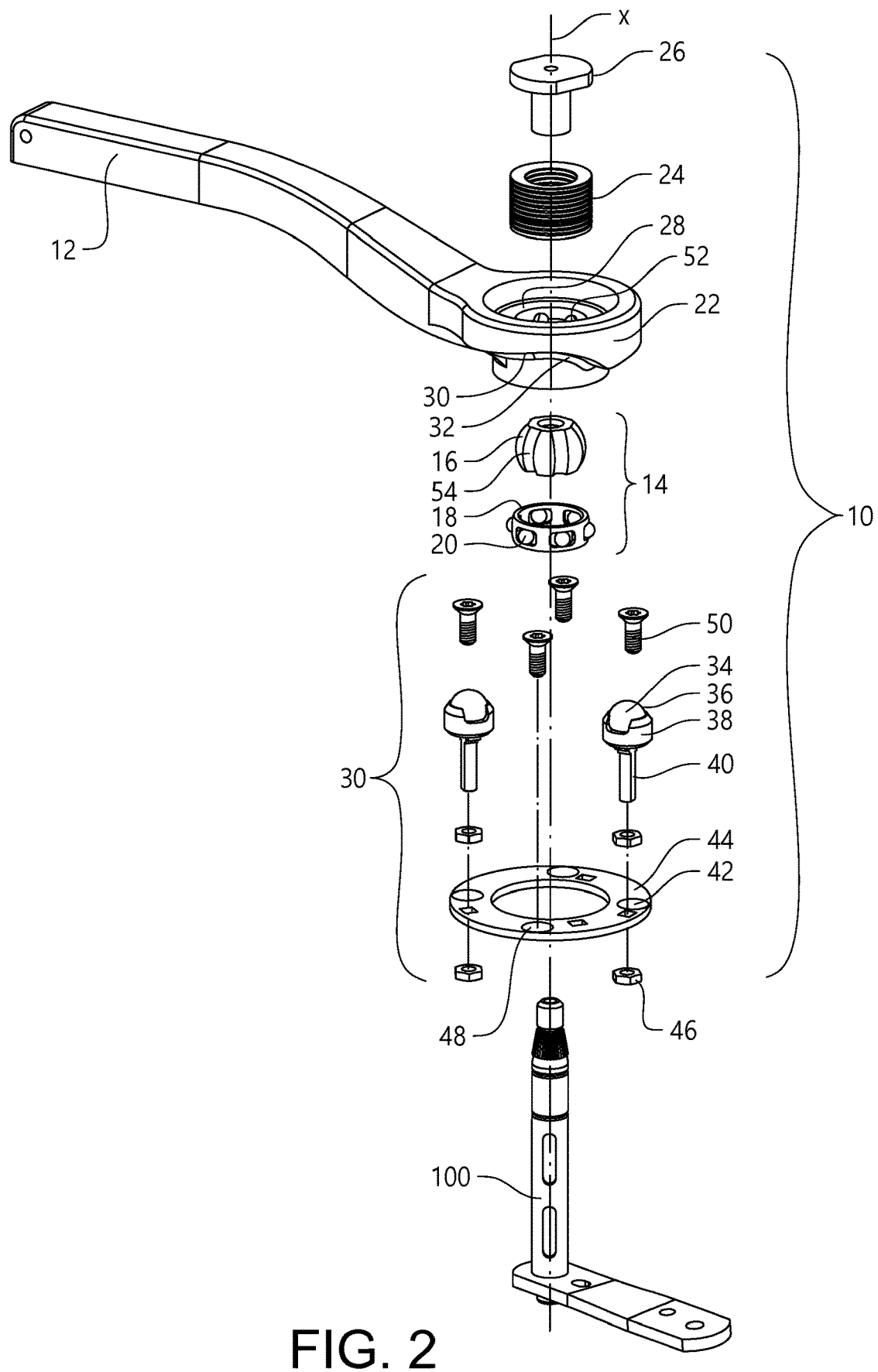
FIG. 2 illustrates an exploded view of a wiper system according to at least one exemplary embodiment of the invention and a rotating shaft to which the wiper system may be connected.

FIG. 2 illustrates an exploded view of a wiper system 10 according to at least one exemplary embodiment of the invention and a rotating shaft 100 to which the wiper system 10 may be connected. The rotating shaft 100 may suitably be motor-driven and configured to oscillate back and forth, i.e. clockwise and anti-clockwise.

The wiper system 10 comprises a wiper arm 12, only a part of which is shown in FIG. 2. Normally, the wiper arm 12 comprises a wiper blade or has a wiper blade attached to the wiper arm 12 for wiping a vehicle window (such as front window 4 in FIG. 1). As shown in FIG. 2, the wiper arm 12 has a geometrical axis of rotation x, said geometrical axis of rotation x extending in an axial direction. As will be described in more detail, the wiper arm 12 may be connected to the rotating shaft 100 so that the rotating motion of the shaft 100 is transferred into a rotating motion of the wiper arm 12 about said geometrical axis of rotation x.

The wiper system 10 further comprises a connecting arrangement 14 configured to connect the wiper arm 12 to the rotating shaft 100, and to transfer the rotating motion of the shaft 100 to the wiper arm 12. In the illustrated exemplary embodiment, the connecting arrangement 14 forms part of a constant-velocity joint and comprises a sleeve 16 and a cage 18 holding balls 20. The sleeve 16 is configured to engage with and surround an end portion of the rotating shaft 100, such as a splined end portion. Suitably, the sleeve 16 may on its interior be provided with mating splines so as to transfer the motion of the rotating shaft 100 via the balls 20 to the wiper arm 12, as will be described in more detail below. The interior of the sleeve 16 may in this and in other embodiments, suitably be tapered so as to form a tapered connection with a corresponding tapered portion of the shaft 100. Thus, in at least some exemplary embodiments, the interior of the sleeve 16 is tapered and/or splined.

The cage 18 is configured to be placed around the sleeve 16 so that each ball 20 in the cage 18 engages both the sleeve 16 and an interior portion of the wiper arm 12, wherein said interior portion of the wiper arm 12 is configured to surround the cage 18. Said interior portion of the wiper arm 12 is suitably located at an end portion 22 of the wiper arm 12.

The wiper system 10 further comprises a spring arrangement 24 configured to resiliently press the wiper arm 12, in particular the end portion 22 thereof, against the connecting arrangement 14 in the axial direction. In the illustrated exemplary embodiment, the spring arrangement 24 is in the form of a stack of disc springs (although a compression spring would be a conceivable alternative). The spring arrangement 24 may, for instance, extend between an abutment surface and the wiper arm, such as between an abutment surface of a flange of a nut 26 and a shelf 28 in the wiper arm, as illustrated in FIG. 2. The shelf 28 is here illustrated as being provided in a recess at the end portion, however, any other suitable configurations for receiving the spring arrangement 24 may be used. Furthermore, it should be understood that the spring arrangement 24 does not need to be in direct contact with the nut 26 and/or the wiper arm 12. For instance, one or more washers may be provided between the spring arrangement 24 and the flange of the nut 26 and/or the shelf 28.

The wiper system 10 further comprises a tilting arrangement 30 configured to vary the inclination of the pressed wiper arm 12 relative to said geometrical axis of rotation x based on the rotational position of the wiper arm 12 about said geometrical axis of rotation x. Thus, in addition to following the rotation of the rotating shaft 100, the wiper arm 12 is also controllable to move in other directions. It should be understood that the wiper arm 12 as such, or at least a portion of the wiper arm 12, may form part of the tilting arrangement 30.

In the present illustration the tilting arrangement 30 comprises a cam mechanism which includes a cam surface 32 on the wiper arm 12 and a mating surface 34 on fixed spherical components 36. The cam surface 34 is suitably provided with a varying inclination relative to the geometrical axis of rotation x, the varying inclination being designed to appropriately correspond to the inclination of the window area to be wiped. Thus, when the cam surface 32 rides on the fixed spherical components 36, due to the varying inclination of the cam surface 32 of the wiper arm 12, the wiper arm 12 will be tilted in the different inclinations as the cam surfaces 32 continues its ride on the fixed spherical components 36.

In the present exemplary illustration, the fixed spherical components 36 are like small globes held in a socket 38, in which they can rotate, but they cannot move out of their respective socket 38. Thus, each socket 38 holds its spherical component 36 at the same position relative to the vehicle body to which the socket is directly or indirectly fastened. In the present illustration, the socket 38 has a downwardly extending protrusions 40 configured to pass through respective first openings 42 of a ring-shaped plate 44, the protrusions 40 being held firmly to the ring-shaped plate 44 by nuts 46 on either side of the ring-shaped plate 44. The ring-shaped plate 44 is also provided with second openings 48 for receiving fasteners 50 such as screws, bolts or rivets, for securing the ring-shaped plate 44 directly or indirectly to the vehicle body. Instead of having two fixed spherical components 36, it is conceivable to have another number in other exemplary embodiments, such as a single fixed spherical component (as in the exemplary embodiment of FIGS. 5a-5c), or three or four fixed spherical components. Furthermore, instead of being spherical, the fixed component may have different configurations in other exemplary embodiments, such as wheel- or doughnut-shaped components (as in the exemplary embodiment of FIG. 6) which may be held by an appropriate socket, bearing or the like.

As can be seen in FIG. 2, the end portion 22 of the wiper arm 12 comprises pockets or race grooves 52 (and seen even better in FIGS. 5a-5c), each defined by a race groove wall. Each ball 20 held in the cage 18 is configured to mate with a respective one of said race grooves 52 and to transmit the rotating force of the shaft 100 to the wiper arm 12 via engagement with the race groove wall. The balls 20 in the cage 18, as well as the race grooves 52 in the wiper arm, are suitably equidistantly separated in the circumferential direction.

Similarly, as can be seen in FIG. 2, the sleeve 16 is provided with a plurality of cavities 54 for receiving a respective one of said plurality of balls 20 so that each ball 20 is partly housed in one of said plurality of cavities 54 and partly housed in one of said plurality of race grooves 52. Said cavities 54 may also be considered to be race grooves, but for avoiding confusion of terms, in this application the race grooves in the sleeve 16 will be referred to as cavities 54.

The race grooves 52 and cavities 54 function as guiding tracks for the balls 20. Thus, when the cam surface 32 of the wiper arm 12 runs on the mating surface 34 of the fixed component and becomes subjected to a tilting force, the tilting of the wiper arm 12 will cause the balls 20 in the cage 18 to travel up or down along the race groves 52. If a ball moves upwards in one race groove 52, a diametrically oppositely located ball 20 will move downwards in its associated race groove 52 (this is clear from FIG. 5c, for instance). If one considers a geometrical plane which extends through the centre of each ball 20 in the cage 18, then there will be a geometrical pivot point inside the sleeve 16 that will always be cut by said geometrical plane of the cage 18. Suitably, said geometrical pivot point may be at the centre of the sleeve 16.

Thus, from the above, it should be clear that the connecting arrangement 14 enables the wiper arm 12 to not only follow the back-and-forth rotating motion of the rotating shaft 100, but also allows for a tilting motion in other directions. In particular, it will be appreciated that the connecting arrangement 14 is configured to enable the wiper arm 12 to tilt in any radial direction (i.e. in a direction extending perpendicularly from the geometrical axis of rotation x). Put differently, the wiper arm 12 can be tilted in the longitudinal direction of the wiper arm 12. However, as will also be appreciated, the connecting arrangement 14 also enables the wiper arm 12 to be tilted transversely to the longitudinal direction of the wiper arm 12. This is more clearly shown in FIGS. 3a-3c.

Figure 3A:
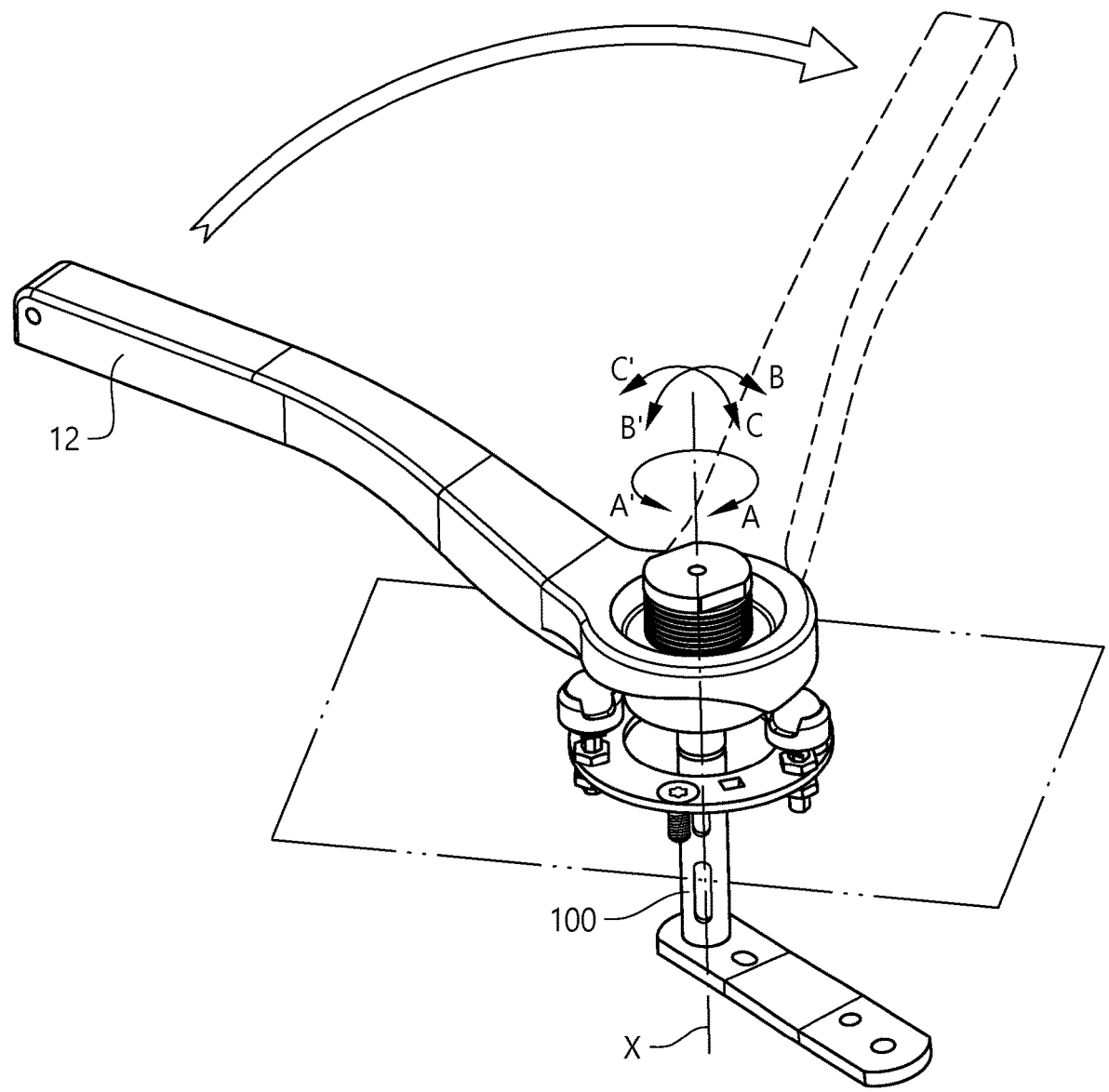
FIGS. 3a-3c illustrate a motion sequence for a wiper system according to at least one exemplary embodiment of the invention.
Figure 3B:
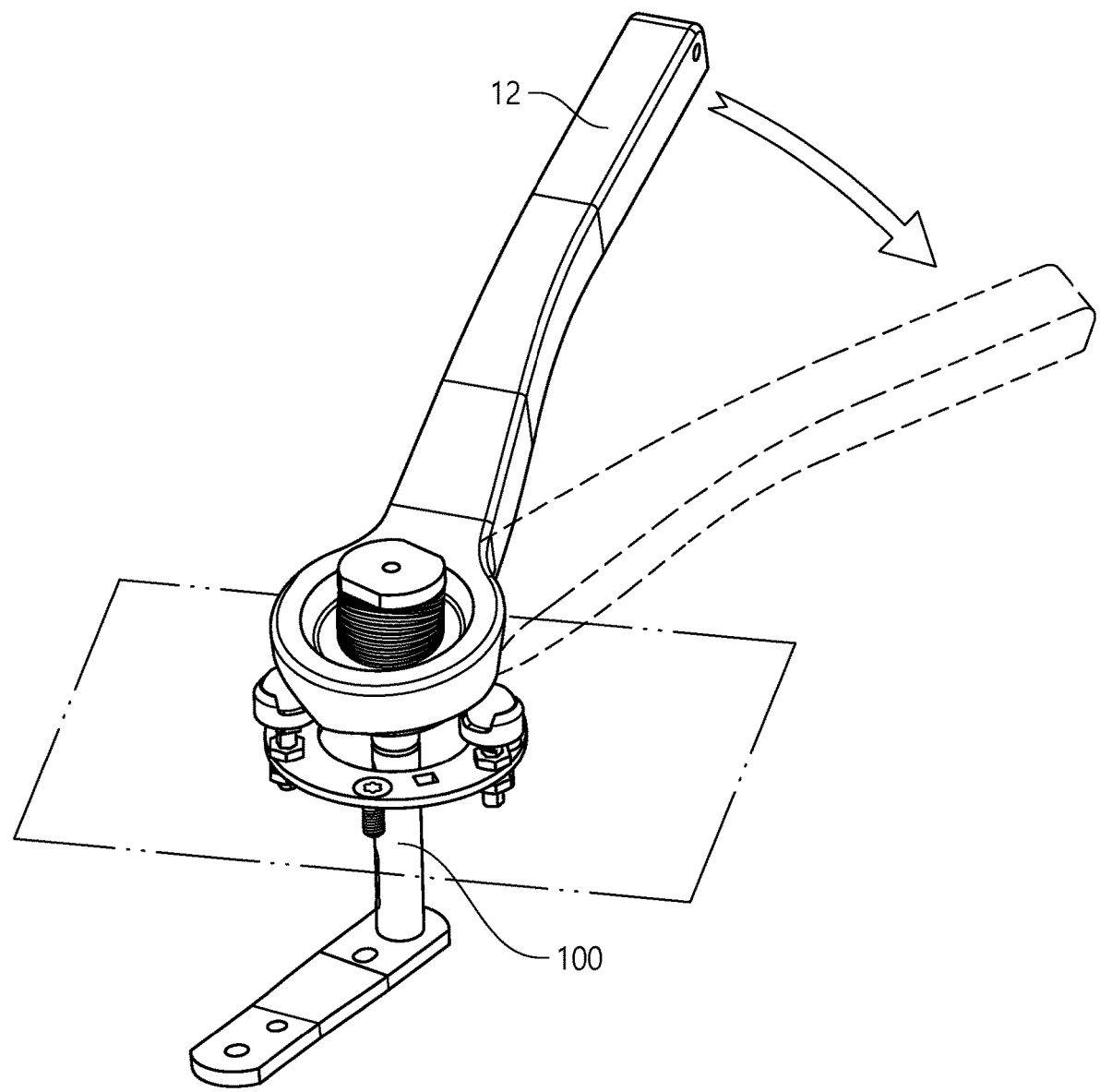
Figure 3C:
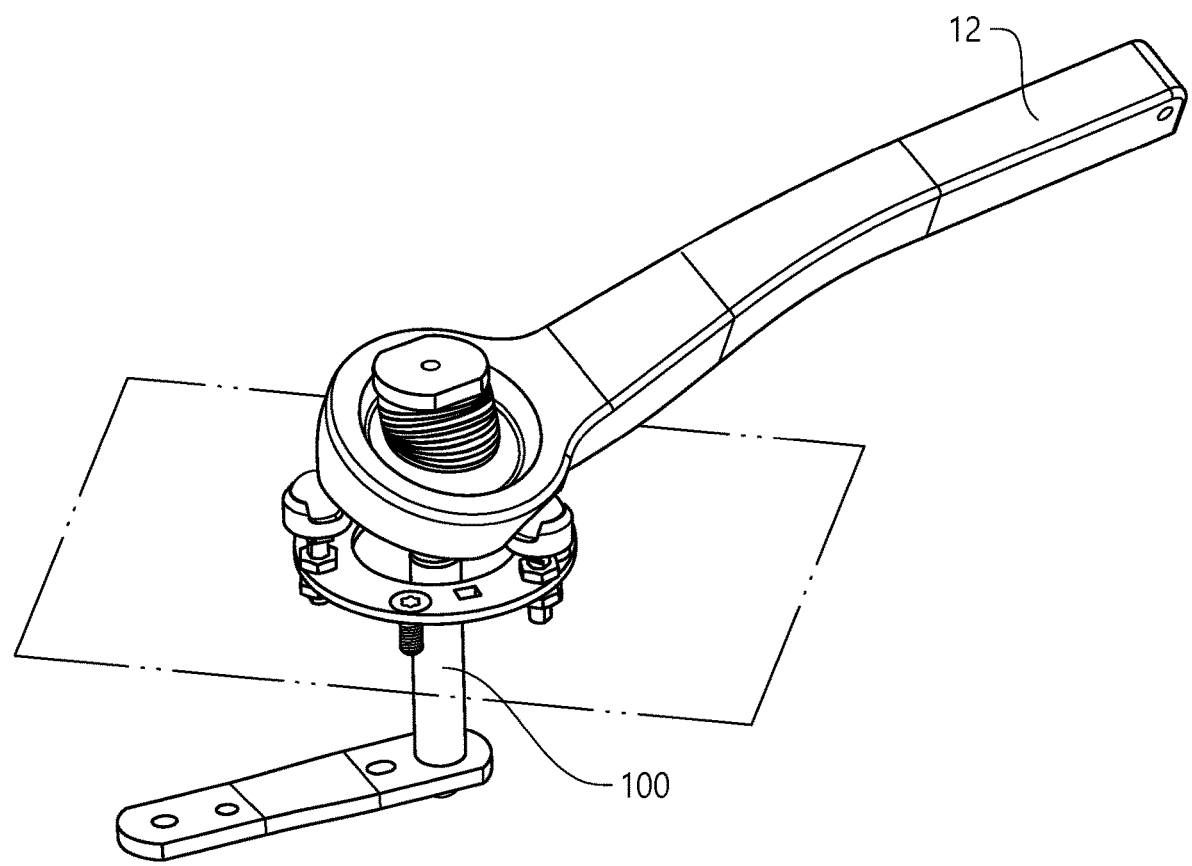

FIGS. 3a-3c illustrate a motion sequence for a wiper system according to at least one exemplary embodiment of the invention. As illustrated by the large arrow in FIG. 3a, the wiper arm 12 (solid lines) will in its motion pass another position (dashed lines), which corresponds to the position of the wiper arm 12 (solid lines) in FIG. 3b. Similarly, in FIG. 3b, the large arrow shows the continuing motion to a further position (dashed lines), which corresponds to the position of the wiper arm in FIG. 3c.

This motion depicted by the large arrow in the sequence from FIG. 3a through FIG. 3c, follows the rotating motion of the shaft 100 to which the wiper system is connected. This motion and the reverse sequence (from FIG. 3c through FIG. 3a) is the back-and-forth rotating motion about the geometric axis of rotation x of the wiper arm, which coincides with the rotational axis of the shaft 100. This direction is indicated by the double arrow A-A'. As also illustrated in FIG. 3a, by the double arrow B-B', the wiper arm 12 can also be caused to tilt in a transverse direction to the longitudinal extension of the wiper arm. Additionally, the double arrow C-C' indicates that the wiper arm 12 is also enabled to tilt in the longitudinal direction of the wiper arm, i.e. substantially in radial directions from the geometrical axis of rotation x. As is clear when comparing FIG. 3c with FIG. 3a, the wiper arm has been moved in the A, B and C directions. The tilting in the B and C directions has been effected by means of the tilting arrangement 30 discussed in FIG. 2, and which will now be further discussed in connection with FIGS. 4a-4c.

Figure 4A:
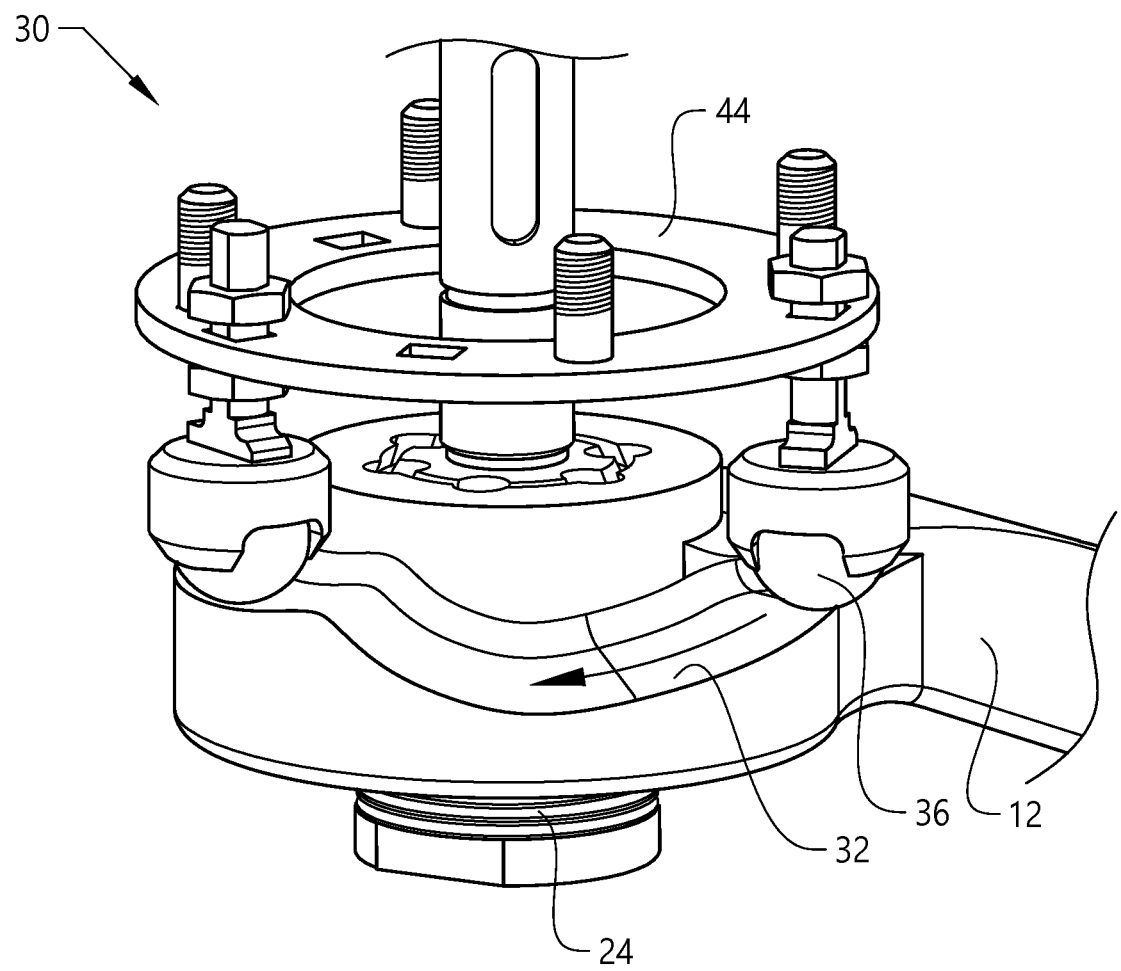
FIGS. 4a-4c illustrate a motion sequence for the tilting arrangement of the wiper system shown in FIG. 3.
Figure 4B:
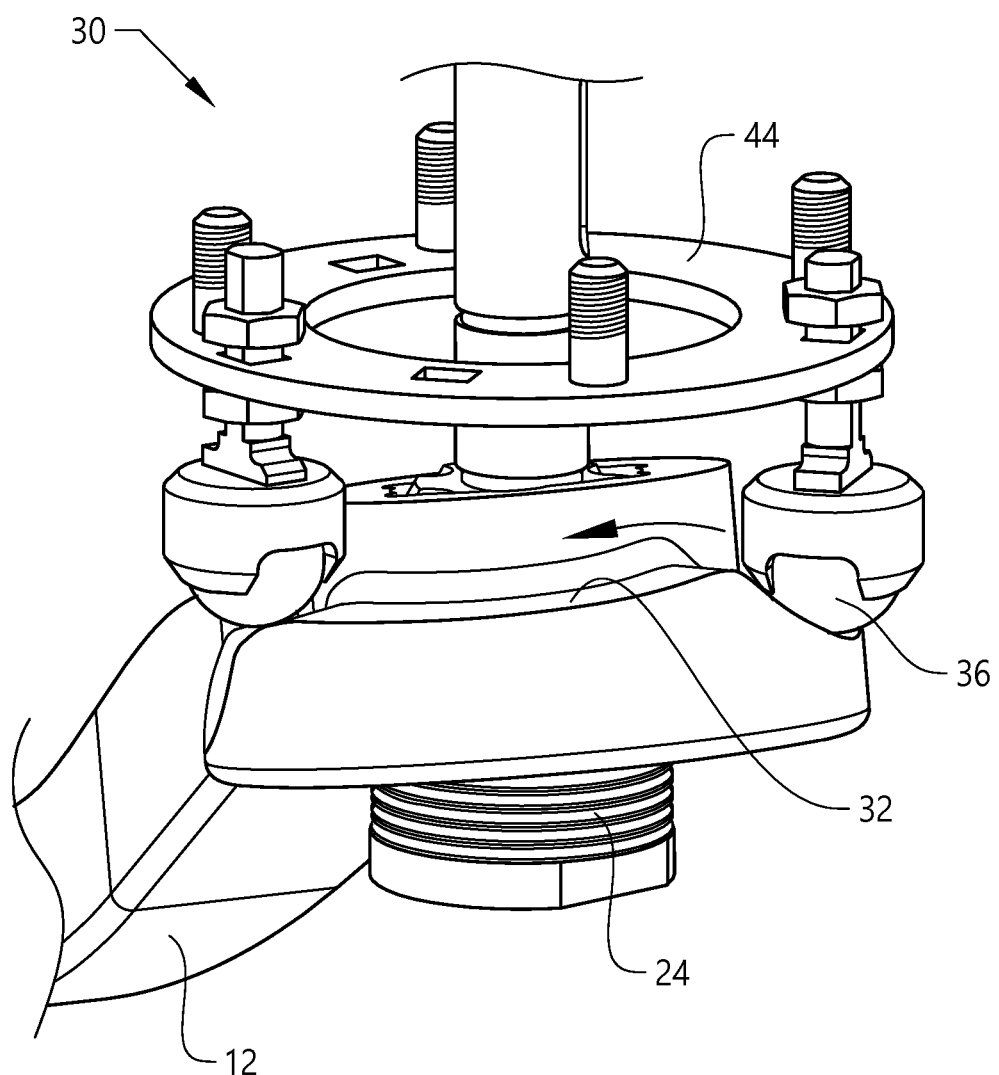
Figure 4C:
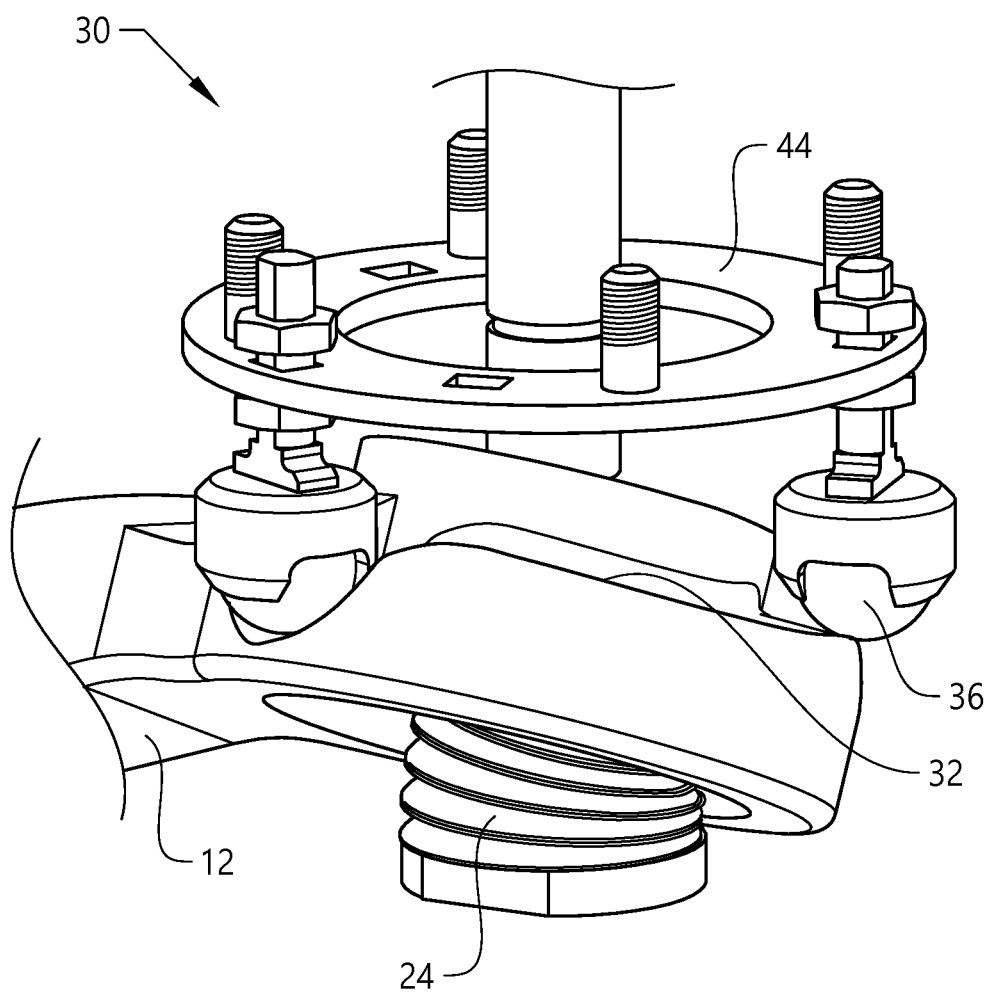

FIGS. 4a-4c illustrate a motion sequence for the tilting arrangement 30 of the wiper system shown in FIG. 3. Thus, the positions of the wiper arm 12 shown in FIGS. 4a, 4b, and 4c correspond to the positions of the wiper arm 12 shown in FIGS. 3a, 3b and 3c, respectively. However, for the sake of clarity the detailed view is shown upside down in FIGS. 4a-4c, compared to FIGS. 3a-3c.

As can be seen in FIG. 4a the cam surface 32 of the wiper arm has a varying inclination relative to a fixed plane, such as the plane of the ring-shaped plate 44. As one follows the cam surface 32 along the circumferential direction (indicated by the arrow in FIG. 4a), just like the fixed spherical components 36 will (in a relative sense, as it is in fact the arm 12 with its cam surface 32 that will be moving), one notes the topography of the cam surface 32 changes both in the axial direction and in the radial directions, which will cause the wiper arm 12 to tilt both in the B-B' direction and the C-C' direction when the wiper arm performs its back-and-forth wiping movement (A-A') about the geometrical axis of rotation x.

The spring arrangement 24 causes the cam surface 32 and the mating surface on the fixed component 36 to be pressed against each other. Thus, the spring arrangement 24 achieves a steady and controlled variable tilting by providing for a good contact between the cam surface 32 and the mating surface of the fixed component 36, whereby the wiper arm 12 is stabilized throughout its rotating and tilting motions.

Figure 5A:
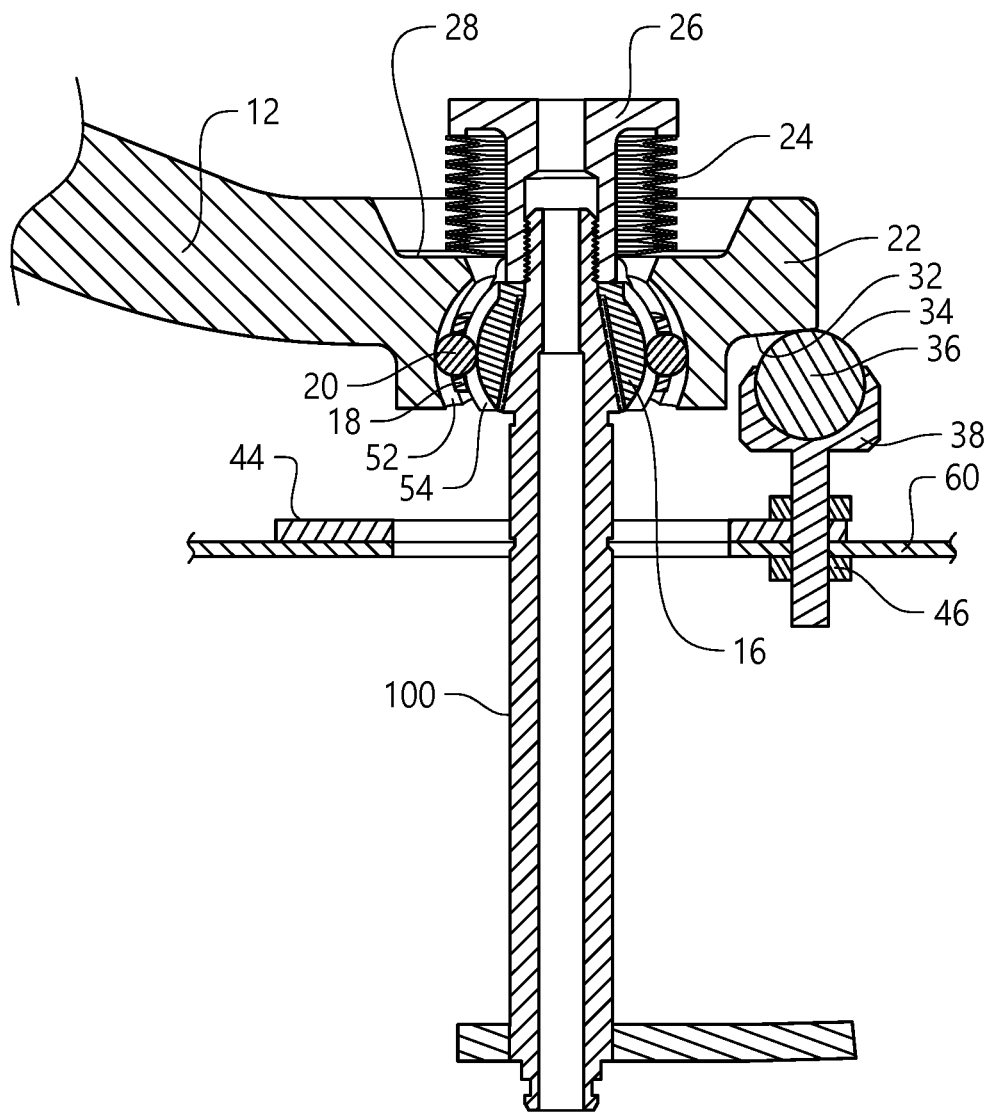
FIGS. 5a-5c illustrate, in a partly cross-sectional view, a motion sequence for a wiper system according to at least another exemplary embodiment of the invention.
Figure 5B:
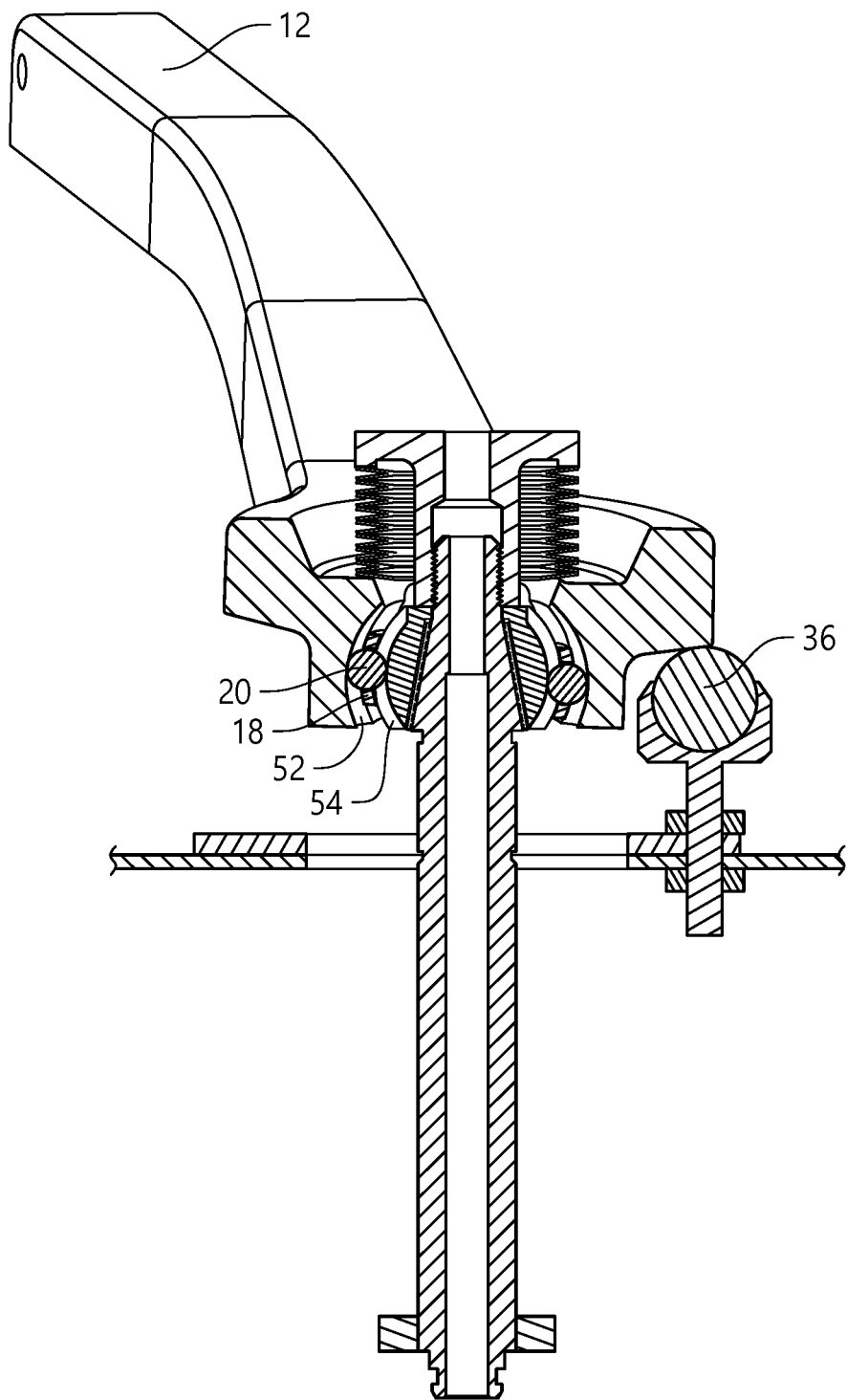
Figure 5C:
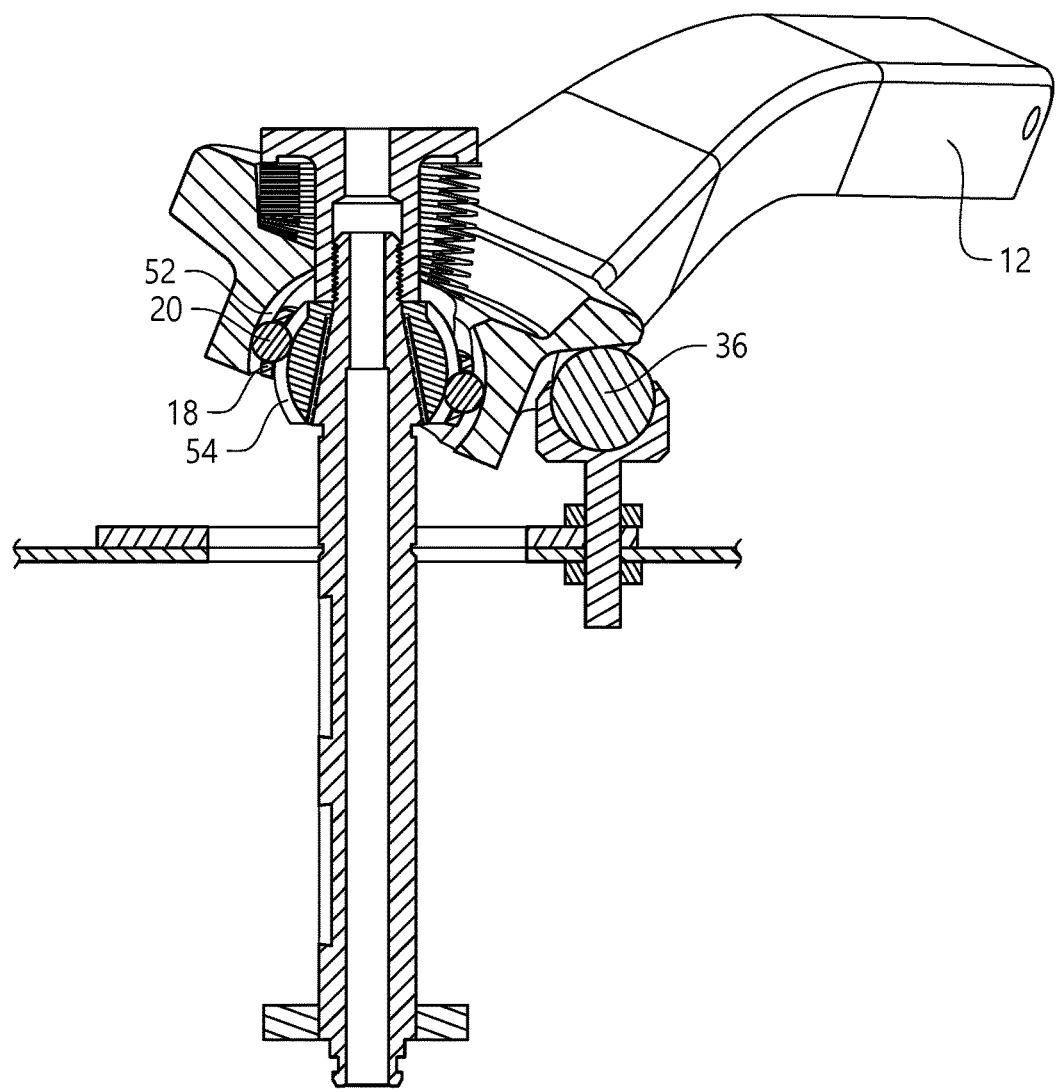

FIGS. 5a-5c illustrate, in a partly cross-sectional view, a motion sequence for a wiper system according to at least another exemplary embodiment of the invention. Instead of two fixed spherical components 36 as shown in the previous figures, the embodiment in FIGS. 5a-5c only has one fixed spherical component.

The positions of the wiper arm 12 shown in FIGS. 5a, 5b, and 5c correspond to the positions of the wiper arm 12 shown in FIGS. 3a, 3b and 3c, respectively.

The previously, discussed components of the wiper system are clearly visible in the cross-sections of FIGS. 5a-5c, and will just for the sake of clarity be repeated now with reference to FIG. 5a. Thus, in FIG. 5a, the sleeve 16 has been connected in a spline connection to the rotating shaft 100. The cage 18 is provided around the sleeve 16. The cage 18 holds a plurality of circumferentially distributed balls 20. The balls 20 are engaged in and guided by respective cavities 54 in the sleeve 16 and respective race grooves 52 in the end portion 22 of the wiper arm 12. The rotational motion of the shaft 100 is transferred via the sleeve 16 and the balls 20 to the wiper arm 12. The flanged nut 26 is threaded onto a threaded end of the shaft 100 and may form a stop surface against the sleeve 16, keeping the sleeve 16 secured against the shaft 100. The spring arrangement 24 extends between a flange of the flanged nut 26 and the shelf 28 in the end portion of the wiper arm 12. The end portion 22 of the wiper arm 12 has a downwardly facing cam surface 32 which rides on a mating surface 34 of the fixed spherical component 36. The fixed spherical component 36 is held in place by the socket 38 which is fixed to the ring-shaped plate 44 by means of nuts 46. The ring-shaped plate 44 is in its turn fixed to the vehicle body 60 by means of fasteners (not shown in FIG. 5a, see fasteners 50 in FIG. 2).

Figure 6:
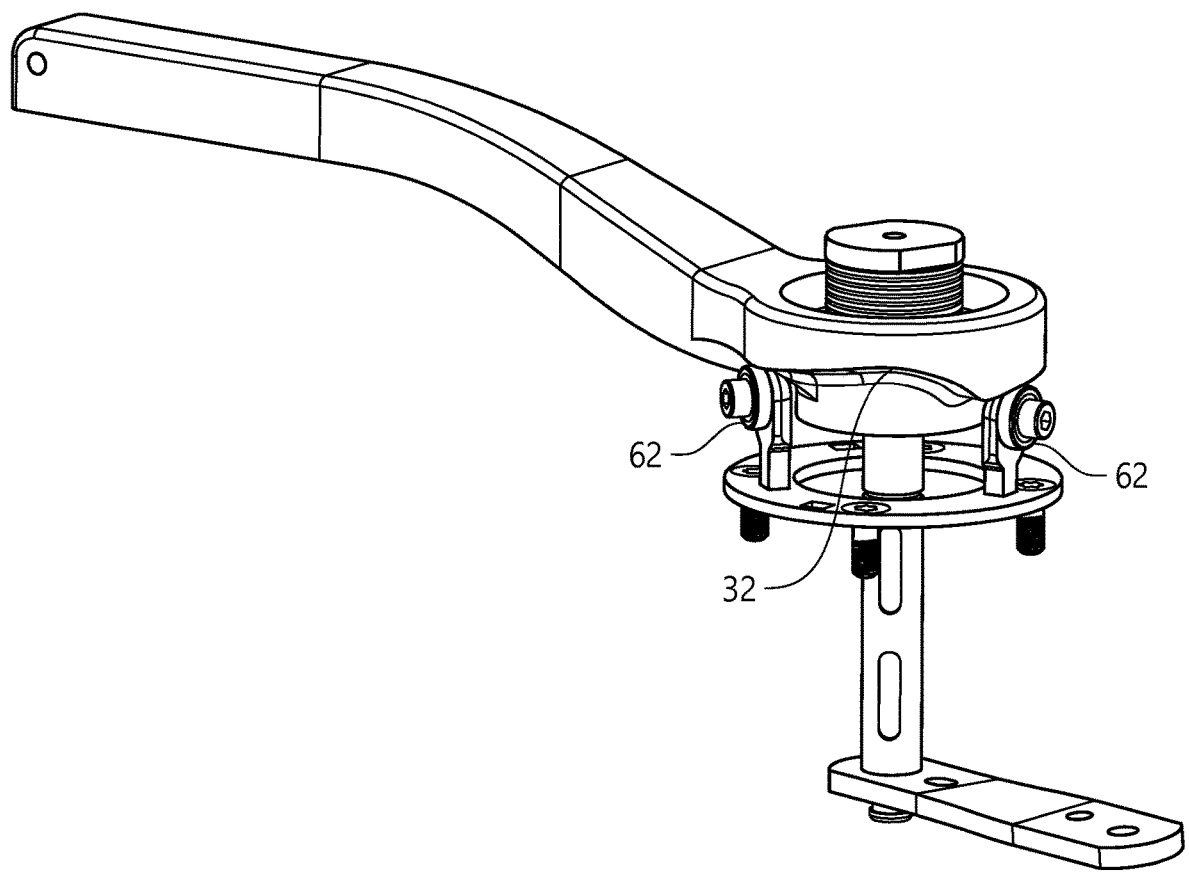
FIG. 6 illustrates a wiper system according to at least a further exemplary embodiment of the invention.

FIG. 6 illustrates a wiper system according to at least a further exemplary embodiment of the invention. The same inventive principles apply to this example as for the other exemplary embodiments, however, instead of the previously shown fixed spherical components 36 the wiper system is in FIG. 6 provided with one or more wheel- or doughnut-shaped components 62 (two shown in the example in FIG. 6), which may be held in place by an appropriate bearing or the like. The cam surface 32 will ride on the wheel-shaped components 62 in the corresponding way as previously discussed and perform the corresponding rotating and tilting motions. Suitably, the mating surface of each wheel-shaped component 62, has a radius of curvature similar to the curvature of the previously discussed spherical components 36. Also, even though the wheel-shaped components 62 may be allowed to rotate around their centre axes, they are still considered to be fixed components, since they are held in a fixed place relative to the vehicle body.

It is to be understood that the present invention is not limited to the embodiments described above and illustrated in the drawings; rather, the skilled person will recognize that many changes and modifications may be made within the scope of the appended claims.

The invention claimed is:

1. A wiper system, comprising:
a wiper arm having a geometrical axis of rotation, the geometrical axis of rotation extending in an axial direction,
a connecting arrangement configured to connect the wiper arm to a motor-driven rotating shaft, wherein the connecting arrangement is configured to transfer a rotating motion of the shaft into a rotating motion of the wiper arm about the geometrical axis of rotation,
a spring arrangement configured to resiliently press the wiper arm against the connecting arrangement in the axial direction, and
a tilting arrangement configured to vary an inclination of the pressed wiper arm relative to the geometrical axis of rotation based on a rotational position of the wiper arm about the geometrical axis of rotation.

2. The wiper system of claim 1, wherein the connecting arrangement forms part of a constant-velocity joint.

3. The wiper system of claim 1:
wherein an end portion of the wiper arm comprises at least one race groove defined by a race groove wall, and
wherein the connecting arrangement comprises at least one ball configured to mate with the race groove and to transmit a rotating force of the shaft to the wiper arm via engagement with the race groove wall.

4. The wiper system of claim 3, wherein the connecting arrangement comprises a plurality of circumferentially distributed balls configured to mate with a respective one of a plurality of race grooves in the end portion of the wiper arm for transmitting the rotating force of the shaft to the wiper arm.

5. The wiper system of claim 4, wherein the connecting arrangement comprises a cage holding the plurality of balls.

6. The wiper system of claim 5:
wherein the connecting arrangement comprises a sleeve configured to be attached to the shaft so as to rotate with the shaft, and
wherein the cage is configured to surround the sleeve.

7. The wiper system of claim 6, wherein the sleeve is provided with a plurality of cavities for receiving a respective one of the plurality of balls so that each ball is partly housed in one of the plurality of cavities and partly housed in one of the plurality of race grooves.

8. The wiper system of claim 4:
wherein the race grooves and balls are configured and dimensioned to allow the wiper arm to tilt in any radial direction, and
wherein a radial direction is defined as a direction extending perpendicularly from the geometrical axis of rotation.

9. The wiper system of claim 1:
wherein the connecting arrangement is configured to enable the wiper arm to tilt in any radial direction, and
wherein a radial direction is defined as a direction extending perpendicularly from the geometrical axis of rotation.

10. The wiper system of claim 1, wherein the tilting arrangement comprises a cam mechanism.

11. The wiper system of claim 10, wherein the cam mechanism is radially offset relative to the geometrical axis of rotation.

12. The wiper system of claim 10:
wherein the wiper system further comprises a fixed component relative to which the wiper arm is movable,
wherein the cam mechanism comprises a cam surface having a varying inclination relative to the geometrical axis of rotation and a mating surface with which the cam surface cooperates, and
wherein one of the wiper arm and the fixed component is provided with the cam surface and the other one of the wiper arm and the fixed component is provided with the mating surface.

13. The wiper system of claim 12, wherein the cam surface is a radially projecting surface of the wiper arm, wherein the mating surface is formed by a spherical or partly spherical component provided radially displaced from the geometrical axis of rotation.

14. The wiper system of claim 12, wherein the spring arrangement is configured to cause the cam surface and the mating surface to be pressed against each other.

15. The wiper system of claim 1, wherein the spring arrangement comprises a stack of disc springs.

16. The wiper system of claim 1, wherein the spring arrangement extends from an abutment surface, such as a surface of a washer or a nut flange, to the wiper arm or to an intermediate contact component, such as a washer, in contact with the wiper arm.

17. A vehicle comprising:
a motor-driven rotating shaft, and
the wiper system of claim 1, wherein the connecting arrangement connects the wiper arm to the motor-driven rotating shaft.

* * * * *